United States Patent [19]

Zagranski et al.

[11] Patent Number: 4,500,966
[45] Date of Patent: Feb. 19, 1985

[54] SUPER CONTINGENCY AIRCRAFT ENGINE CONTROL

[75] Inventors: Raymond D. Zagranski, Somers; James J. Howlett, North Haven; Nicholas D. Lappos, Madison, all of Conn.

[73] Assignee: Chandler Evans Inc., West Hartford, Conn.

[21] Appl. No.: 382,258

[22] Filed: May 26, 1982

[51] Int. Cl.³ .............. G06F 15/50; G05B 13/02; F02C 9/42
[52] U.S. Cl. .................................. 364/432; 364/433; 364/431.02
[58] Field of Search ............. 364/432, 433, 431.02, 364/431.01, 460, 461

[56] References Cited

U.S. PATENT DOCUMENTS

| | | | |
|---|---|---|---|
| 3,963,372 | 6/1976 | McLain et al. | 364/431.02 X |
| 3,969,890 | 7/1976 | Nelson | 364/431.02 X |
| 4,083,235 | 4/1978 | Gallant | 364/431.02 X |
| 4,117,668 | 10/1978 | Elsaesser et al. | 364/431.02 X |
| 4,236,212 | 11/1980 | Arents | 364/432 X |
| 4,296,601 | 10/1981 | Martin | 364/431.02 X |
| 4,410,948 | 10/1983 | Doniger et al. | 364/431.02 X |

*Primary Examiner*—Gareth D. Shaw
*Assistant Examiner*—Ronni S. Malamud
*Attorney, Agent, or Firm*—M. P. Williams

[57] ABSTRACT

A fuel control (23) for an aircraft engine (10) employs super contingency logic (76) in response to low rotor speed of a helicopter (130) engine failure (131) or entry into an avoid region of a flight regime following engine failure (133) to alter (161, 166–169) limits on the gas generator (30) of a free turbine gas engine (10), whereby following engine failure or in periods of extreme power need, risk of stressing an engine to its failure point is undertaken in favor of acquiring enough power to avoid a certain crash.

7 Claims, 7 Drawing Figures

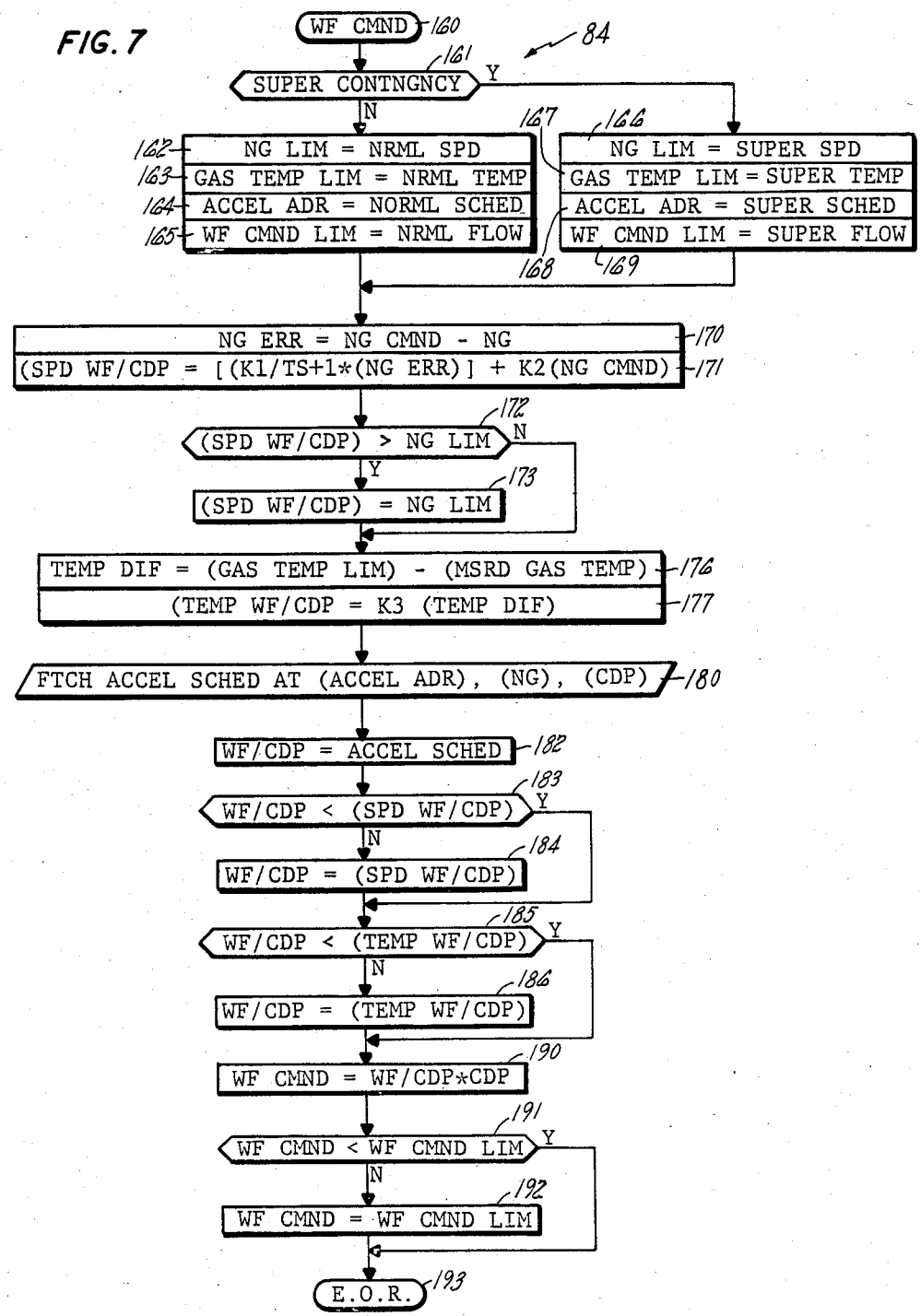

SUPER CONTINGENCY AIRCRAFT ENGINE CONTROL

The Government has rights in this invention pursuant to Contract No. DAAK51-80-C-0038 awarded by the Department of the Army.

DESCRIPTION

1. Technical Field

This invention relates to aircraft engine controls, and more particularly to controls related to purposefully driving aircraft engines at or near their ultimate operating limit when, due to loss of an engine or other conditions, insufficient power to avoid a crash would otherwise be available, and to providing advice to the pilot.

2. Background Art

In both fixed and rotary wing aircraft, it is necessary to have sufficient engine thrust to provide aerodynamic control of the aircraft. This is more particularly true in the case of helicopters, partly because of the high maneuverability of the helicopter, which may require bursts of thrust that can cause severe engine droops, but also because of the fact that the helicopter employs a rotary wing, which may not be able to provide safe descents in an autorotation mode if there isn't sufficient altitude.

Heretofore, the power obtainable from an engine has generally been absolutely limited by the engine control (typically, the fuel control). This is to protect the engine against undue stress which severely curtails the useful life of the engine, and in the extreme, may cause the engine to fail outright. Thus, when one engine of a multi-engine aircraft fails, the other engines have not heretofore been capable of providing additional thrust or power to mitigate the loss of an engine. For helicopters, this has resulted in what is referred to as a "dead man's curve", which is a map of altitude vs. velocity at which the helicopter will crash. The avoid regions are typically at low velocity (such as below 50 knots) and relatively low altitudes such as between 12 and 150 feet on the one hand, and at extremely low altitudes (below 20 feet) at velocities above 50 knots (up to the maximum autorotation-entry airspeed of the helicopter), on the other hand. To avoid catastrophy on the occurrence of loss of one engine, pilots have heretofore referred to charts to advise them not to fly within these avoid regions; but pilots had no warning of when they were flying in avoid regions.

The necessary consequence of the state of the art relative to severe loss of engine power is that following failure of one engine, the other engine is still protected against stress, resulting in the loss of the aircraft, and possibly personnel, in many cases. In the extreme, the remaining engine, which is protected by its fuel control from undue stress, is nonetheless destroyed upon impact.

DISCLOSURE OF INVENTION

Objects of the invention include provision of super contingency operation of aircraft engines to accommodate severe loss of power, such as when another engine has failed, and to provide automatic advice to the pilot concerning flight within the avoid regions and whether the present flight conditions indicate that he may fly away or should land.

According to the invention, the limits on the gas generator (turbo-compressor) of an aircraft free turbine gas engine are increased, thereby to provide additional power, in the event of severe power requirement (such as by loss of another engine in the aircraft or emergency maneuvering). According further to this aspect of the invention, the gas generator limits which may be increased include rotary speed, temperature and deceleration.

According further to the invention, flight conditions of a helicopter are continuously monitored to indicate to the pilot when he is flying within one of the avoid regions of a flight envelope. According further to this aspect of the invention, the avoid regions are determined by factors which may include power ratio, altitude, climb rate and airspeed. In still further accord with the invention, the limits on the gas turbine engine of a multi-engine helicopter are increased whenever another engine has failed and the aircraft is flying within the avoid regions of a flight envelope. In accordance with the invention still further, whenever the super contingency aspect of the present invention causes the limits on a gas turbine engine to be increased and the aircraft is flying within an avoid region, the pilot is given advice as to whether he should fly away or land.

The invention provides extra power (albeit at the cost of engine stress) under super contingency conditions where the choice is to stress an operating engine or crash. The invention also provides indications to the pilot concerning flying within avoid regions (where maneuvering would be severely curtailed even with the super contingency engine control of the present invention) and concerning whether he should fly away or land.

The invention may be employed with a variety of features, such as a flag to a maintenance crew that an operating engine has in fact been stressed by super contingency control over the engine in accordance with the invention, and an indication of the total duration of such stress. The invention may also be utilized with features which limit the extent of time during which an engine may be stressed (thereby possibly avoiding total failure of the stressed engine) and duration of rest periods defined by blocking the capability of the super contingency engine control after it is once invoked, for a period of time.

The invention may be implemented in analog, digital or programmed computer technology, utilizing apparatus and techniques which are well within the skill of the art in accordance with the teachings which follow hereinafter. However, the invention is described with respect to one exemplary embodiment employing a suitably programmed microcomputer or the like, illustrating a variety of features which may be employed therewith but are not essential thereto.

The foregoing and other objects, features and advantages of the present invention will become more apparent in the light of the following detailed description of exemplary embodiments thereof, as illustrated in the accompanying drawings.

BRIEF DESCRIPTION OF DRAWINGS

FIG. 7 is a simplified logic flow diagram of a weight of fuel command generating routine for controlling fuel flow to the engine both under normal conditions and under super contingency conditions of the present invention.

BEST MODE FOR CARRYING OUT THE INVENTION

Figure 1:
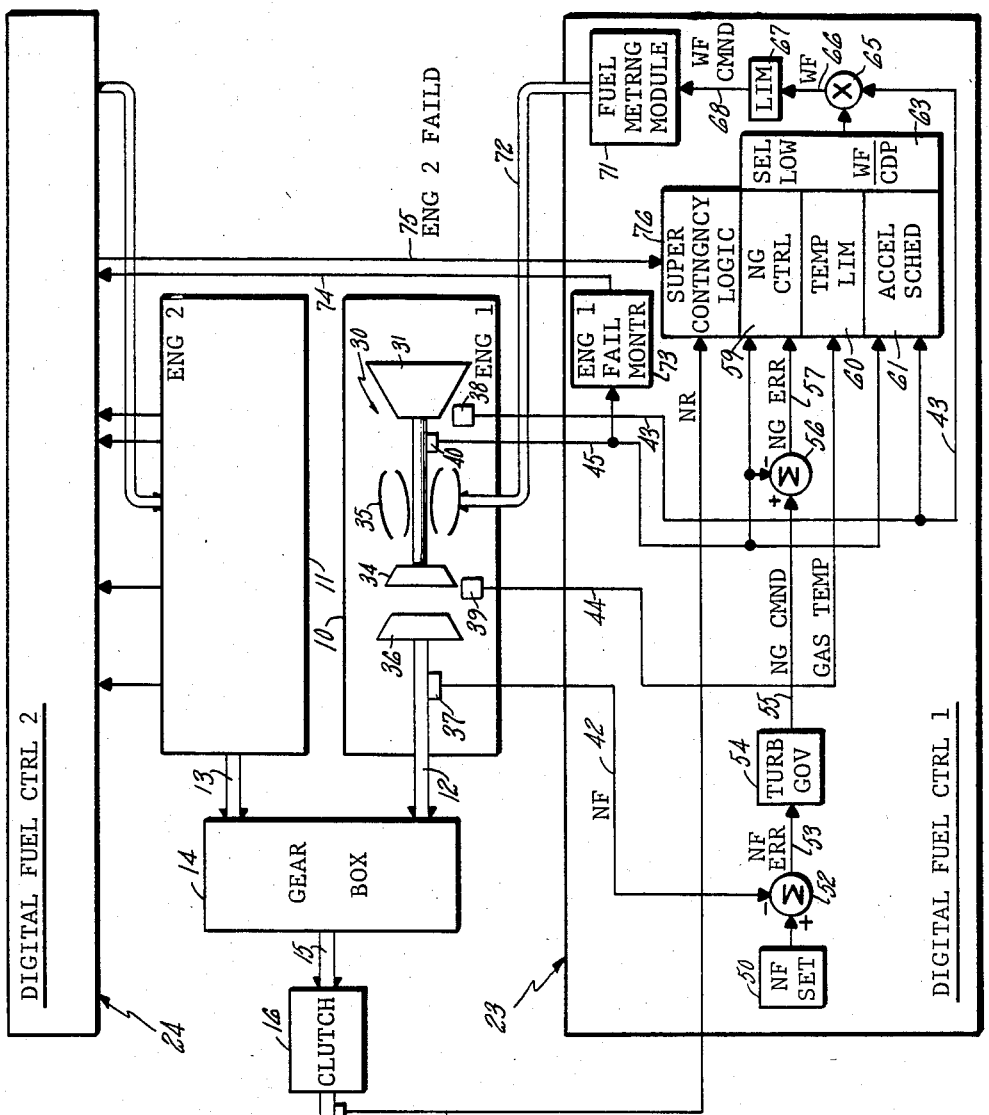
FIG. 1 is a simplified schematic block diagram of a twin engine helicopter drive train having engine controls employing the present invention.

Referring now to FIG. 1, a twin engine helicopter includes first and second engines 10, 11, each having an output shaft 12, 13 feeding a differential gear box 14, the output shaft of which 15 drives an overrunning clutch 16. When engaged, the clutch 16 drives a gear box 17 through a shaft 18 which in turn drives a main rotor 19 through a shaft 20 and a tail rotor 21 through a shaft 22. Each of the engines 10, 11 is controlled by a related engine control 23, 24 which are, in the present exemplary embodiment, digital fuel controls implemented by means of a suitably programmed computer.

In this embodiment, each engine is a free turbine gas engine having a turbo-compressor 30, including a compressor 31 and a shaft 32 which are driven by a turbine 34, and a burner can region 35. The turbo-compressor 30 is referred to herein, frequently, as the gas generator. The hot pressurized gas supplied by the turbo-compressor 30 drives the free turbine 36 which in turn drives the output shaft 12. To monitor engine conditions, a plurality of sensors or transducers 37-40 are provided in the engine. A tachometer 37 provides a free turbine speed signal (NF) on a line 42. A pressure sensor 38 provides a compressor discharge pressure signal (CDP) on a line 43. A temperature sensor 39 provides a gas temperature signal on a line 44. A tachometer 40 provides a gas generator speed signal (NG) on a line 45. In addition, a tachometer 48 provides a rotor speed signal (NR) on a line 49. These signals are fed to the fuel control 23 and utilized generally in a well known fashion, but with aspects of the present invention modifying the use thereof. In FIG. 1, the functions of the fuel control 23 are set out in block form, as they may be provided by dedicated analog or digital hardware. In fact, this is merely illustrative of the interrelationships between the fuel control and the functions of the fuel control; in the embodiment herein, these functions are performed by suitable routines in a computer, some of which relating to the present invention are described in detail with respect to FIGS. 3-7 hereinafter.

Specifically, the turbine set speed function (NF SET) 50 typically provides a turbine reference speed of 100% designed speed, except to the extent which the speed is beeped higher or lower by the pilot. Or, this function may be performed in a more sophisticated fashion, such as that described in copending U.S. patent application Ser. No. 369,302, filed by Morrison et al on Apr. 16, 1982, and disclosing a fuel conserving helicopter engine control. The free turbine speed signal on a line 42 is subtracted from the reference speed provided by the NF SET function 50, as at 52, to provide an error signal on a line 53 which drives a turbine governor function 54. This may simply be suitable gains, filters and limits or it may be provided in a more sophisticated fashion as described in copending U.S. patent application Ser. No. 369,301, filed on Apr. 16, 1982 by Zagranski and Howlett, now U.S. Pat. No. 4,423,593, issued Jan. 3, 1984. The turbine governor function provides a gas generator speed command (NG CMND) on a line 55 which is applied to the gas turbine control portion of the fuel control 23. The command signal on a line 55 is compared with the actual gas generator speed signal (NG) on the line 45, as at 56, to provide a gas generator speed error signal (NG ERR) on a line 57. This together with the speed signal on the line 55 is provided to a gas generator speed control portion 58. In addition, the gas temperature signal on the line 44 is applied to a temperature limiting portion 60 and the speed signal on the line 45 together with the compressor discharge pressure signal on the line 43 are provided to an acceleration schedule portion 61. Each of the portions 59-61 may provide a weight of fuel/compressor discharge pressure ratio as a function of the input signals applied thereto, the lowest value of which is selected by a least select function 63 to provide a desired weight of fuel/compressor discharge pressure ratio signal on a line 64. This is multiplied, as at 65, by the compressor discharge pressure signal to provide a desired weight of fuel signal on a line 66 which, after limiting, as at 67, provides a weight of fuel command signal on line 68. This is fed to a fuel metering module 71 which provides the desired fuel flow through a fuel line 72 to the burner section 35 of the engine 10.

All that has been described thus far with respect to reference numerals 10-72 is exemplary of one known type of fuel control. The invention is described hereinafter with respect to a computerized version of such a fuel control, but the specific fuel control functions and manner of implementation thereof are not essential to the invention; rather, the invention could be employed in other types of fuel controls (implemented in different ways and with different control laws).

Another function which may or may not be provided within the fuel control of an aircraft engine is that of a failure monitor 73 which provides an engine 1 failed signal on a related line 74 which is used to indicate to the pilot that the engine has failed, and used in the present embodiment together with a commensurate engine 2 failed signal on a line 75, in the super contingency delimiting of the opposite engine, in certain cases. The details of engine 11 and its related fuel control 24, and the interconnections therebetween, are the same as those described with respect to engine 10, and are not described further herein. Suffice it to say that in the present embodiment, the engine controls are identical and complementary.

The invention relates to the recognition of certain conditions to invoke super contingency logic 76 which will alter operation of the modules 59, 60 and 61 so as to provide more power (but at the expense of severe stress) to a surviving engine in case of engine failure or to both engines in case of emergency maneuvering, as described more fully hereinafter.

Figure 2:
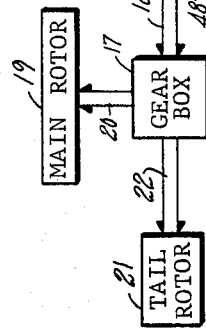
FIG. 2 is a simplified graph illustrating helicopter avoid regions and implications thereof.
Figure 2:
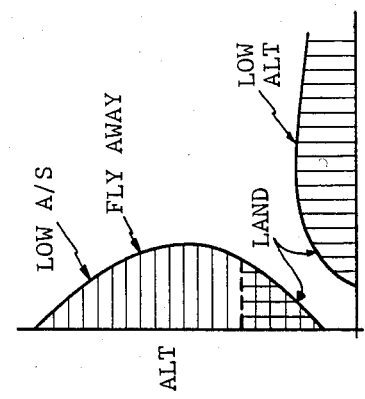

Referring briefly to FIG. 2, a coarse, simplified illustration of avoid regions of helicopter flight regimes is illustrated. Along the ordinate, at low airspeeds, and between altitudes of on the order of 12 and 150 feet, there is a dead man's zone which is horizontally hatched. The upper portion of this (singly hatched) indicates areas where if one engine fails (and absent the advantage of the present invention) the helicopter would crash, but with the extra power provided by the super contingency control of the present invention, the helicopter can actually fly away. At the low altitude end of the low airspeed dead man's zone, a doubly hatched portion indicates that, even with the extra power provided by the super contingency control of the present invention, the pilot should land. Along the abscissa, for airspeeds from on the order of 50 knots to maximum autorotation-entry airspeed, and velocities on the order of below 20 feet or so, there is a dead man's zone indicative of flight regimes in which, if an engine was lost, without the advantage of the present invention, the helicopter would not fly; but with the extra power provided by the super contingency engine control of the present invention, the pilot may land safely. These factors are taken into account in advising the pilot (at any time) when he is in one of these avoid regions, and further advising the pilot when in one of these regions and an engine is lost, whether he should fly away or land for safest operation. In the low airspeed dead man's zone (along the ordinate) a dotted line 77 is indicative of the fact that the present invention may not provide sufficient power for safe flight throughout the dead man's zone as a consequence of super contingency engine control of the present invention, but there may be an absolute dead zone within that dotted line where even the present invention won't help; this depends only on the flight characteristics and ultimate rating on the engine of the aircraft in which the present invention is implemented. Although not shown, the low altitude dead man's curve may also have an inner area not fully correctable by implementation of the present invention, in any given aircraft (such as that indicated for the low airspeed region by the dotted lines 76). However, much of that will fall at altitudes (such as around 10 feet or less) where the aircraft can simply drop without severe damage or danger to personnel. Thus, in the general case, the invention will significantly shrink the dead man's zones, but may eliminate them entirely in many aircraft.

Figure 3:
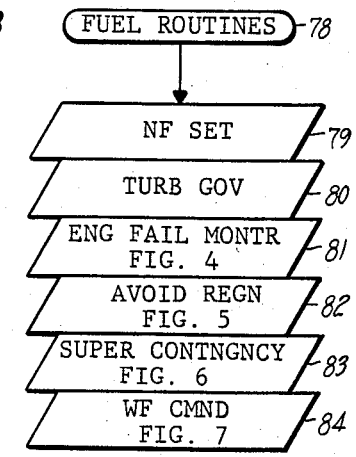
FIG. 3 is a simplified logic flow diagram of fuel routines which may be employed in a computerized engine control employing the present invention.

Referring now to FIG. 3, in the computer of a digital fuel control, which performs many tasks such as fetching and transmitting data, moving data to and from storage, and the like, there will typically be explicit fuel controlling routines. In FIG. 3, these are indicated as being reached through an entry point 78, and a first routine may be an NF SET routine 79 which sets the free turbine reference speed. Such routines may use a portion or all of that disclosed in the aforementioned Morrison et al application. A next routine 80 may be a turbine governor routine, which may simply amplify, shape and limit the turbine speed error signal, or may provide more sophisticated control as in aforementioned Zagranski and Howlett application. A next routine may be an engine fail monitor routine 81 of the simple type described with respect to FIG. 4 hereinafter, or this may be of the type described in a copending U.S. application entitled ENGINE FAILURE DETECTOR, Ser. No. 382,113, filed on by Zagranski and White, now U.S. Pat. No. 4,454,754, issued June 19,1984, which is incorporated herein by reference. The next routine is an avoid region routine 82 of the type described with respect to FIG. 5 hereinafter, which provides indication of the situation described with respect to FIG. 2. The next routine 83 is a super contingency routine, which provides various aspects of the present invention as is described with respect to FIG. 6 hereinafter. And a final fuel routine may be a weight of fuel command generating routine 84 of the type described with respect to FIG. 7 hereinafter, which utilizes the super contingency indications provided in the routine of FIG. 6 to increase the limits on the gas generator of the aircraft engine, in accordance with the invention.

Figure 4:
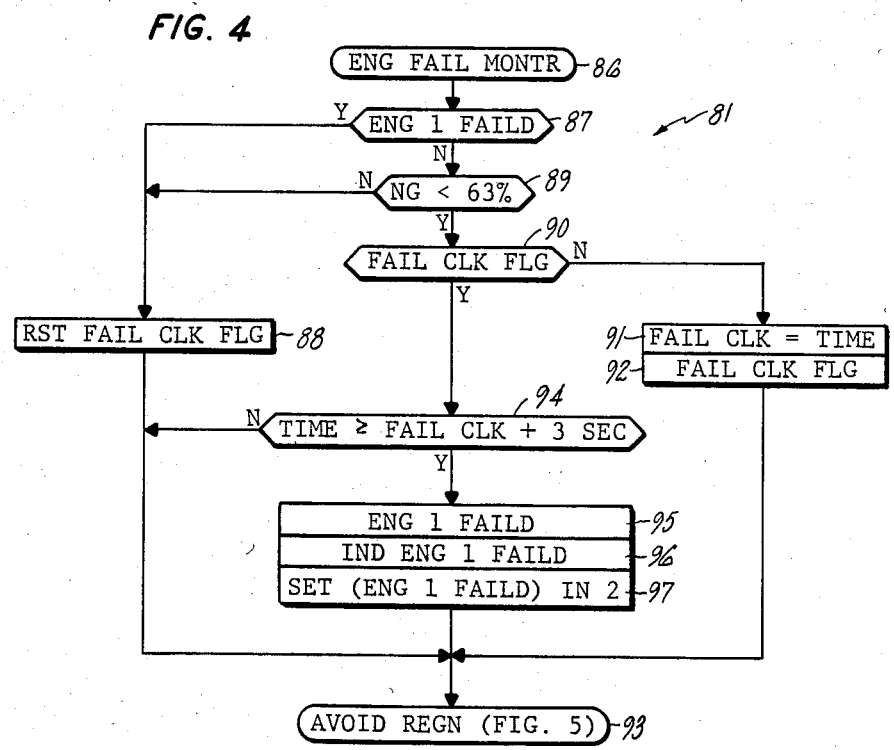
FIG. 4 is a simplified logic flow diagram of an exemplary engine failure monitor routine which may be used in conjunction with the present invention.

Referring to FIG. 4, a simple engine failure monitor routine 81 is reached through an entry point 86 and a first test thereof 87 determines if engine 1 has previously been determined to have failed, in a manner described hereinafter. If so, an affirmative result of test 87 reaches a step 88 wherein a failure clock flag described hereinafter is reset. But if not, then a test 89 determines if the gas generator speed is below a sub-idle value, such as 63% of its rated speed (not to be confused with free turbine rated speed). If the gas generator is not below idle speed, a negative result of test 89 will reach the step 88. But if it is below rated speed, an affirmative result of test 89 will reach a test 90 which determines if the failure clock flag has been set or not. The first time that the gas generator speed drops below 63% (or other threshold value), the fail clock flag will not yet have been set, so a negative result of test 90 will reach a step 91 to set the value in a failure clock register equal to current real time. And then a step 92 sets the failure clock flag so that the failure clock will not have a subsequent time established therein prior to its time out or resetting. Following either step 88 or 92, the program is exited and the avoid region routine 82 of FIG. 4 is reached through a transfer point 93.

In a subsequent pass through the routine of FIG. 4, test 87 will be negative and test 89 will be affirmative if the gas generator speed is still low. In such case, the routine will reach test 90 which will now be affirmative causing a test 94 to be reached to determine if the failure clock has timed out. This is done by comparing real time against the real time set in the failure clock plus some increment, such as three seconds, to determine if the gas generator speed has been below the threshold speed for sufficient time to consider the engine to be failed. Initially, this will not be true and a negative result of test 94 will exit the program through transfer point 93. Eventually, assuming the gas generator speed remains low, through some subsequent pass through the routine of FIG. 4, test 94 will be reached and the requisite time increment will have passed, so an affirmative result of test 94 will reach a step 95 which sets an engine 1 failed discrete, equivalent to the engine 1 failed signal on the line 74. A step 96 will provide an indication to the pilot that engine 1 has failed, and a step 97 sets up a discrete to cause transmission of the fact that engine 1 has failed to the control 24 (FIG. 1) for engine 2, for use in a manner described with respect to FIG. 6 hereinafter. If, however, the gas generator speed recovers before the passage of the failure interval (such as three seconds), then test 89 will reset the failure clock flag (set in step 92) prior to the time that the steps 95-97 are reached. And the process of timing low gas generator speed will commence all over again should the speed once again drop below the threshold sub-idle speed indicative of failure.

Figure 5:
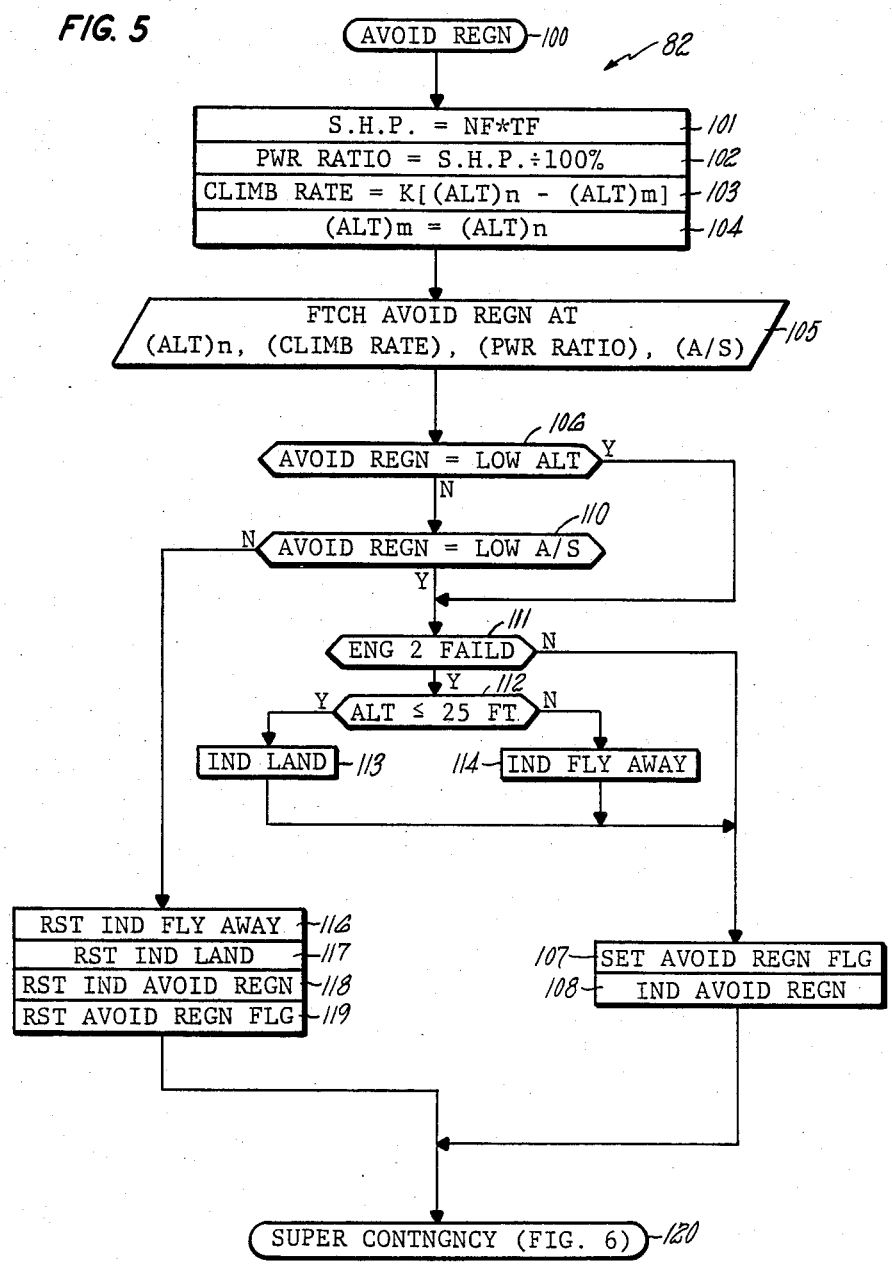
FIG. 5 is a simplified logic flow diagram illustrating an exemplary routine for identifying and analyzing flight within avoid regions illustrated in FIG. 2.

The avoid region routine 82 is reached in FIG. 5 through an entry point 100 and a first step 101 generates an indication of shaft horsepower by multiplying free turbine speed times free turbine torque (if direct torque measurement is available on the engine, which may readily be the case but is not illustrated in FIG. 1). Alternatively, a function of free turbine temperature drop speed may be utilized in place of free turbine torque and speed to provide a general, rough indication of current shaft horsepower being developed. Then a step 102 generates power ratio by dividing current shaft horsepower by 100% of rated shaft horsepower. A step 103 provides an indication of climb rate as the time derivative of altitude by multiplying some integration constant (related to the cycle time of the routine of FIG. 5) by the difference in altitude in two successive altitude readings, the current reading being designated by "n" and the next prior reading being designated by "m". Then, a step 104 updates the prior altitude reading for use in the next subsequent cycle by making it equal to the current altitude reading. Then a subroutine 105 is reached wherein a word representing the flight indications of FIG. 2 is fetched by utilizing, as address components to a read only memory (or other suitable table lookup matrix indicative of FIG. 2), which includes altitude, climb rate, power ratio and airspeed. In a simpler case, a more crude indication may be achieved by utilizing only altitude and airspeed, if desired, but this could provide either risky indications to the pilot, or be required to be so conservative as to curtail maneuvering capability due to lack of indication of the safety thereof to the pilot. In any event, the subroutine 105 will provide a word, the content of which identifies whether the aircraft is flying in the low airspeed region, the low altitude region, or the unmarked, safe region of the flight regime, as indicated in FIG. 2. In a more sophisticated embodiment, the avoid region word fetched by the subroutine 105 may separate the low airspeed region between fly away and land portions thereof, in which case the distinction thereof may be an irregular function of altitude, rather than being at a fixed altitude as indicated in FIG. 2.

The avoid region word is examined first in a test 106 to determine if it indicates the low altitude region (vertically hatched) of the dead man curves of FIG. 2. If it does, an affirmative result of test 106 will reach a test 111. If test 106 is negative, the test 110 determines if the avoid region word indicates the low airspeed region (horizontally hatched) of the dead man curves. If it does, an affirmative result of test 110 will reach a test 111 which examines whether or not engine 2 has been indicated as having failed (such as by having a communication over the line 75 in FIG. 1, or otherwise by I/O data move between the two computers). If engine 2 has not failed, a negative result of test 111 will reach a step 107, to set an avoid region flag (for use in FIG. 6), and a step 108, which provides an indication to the pilot that he is flying within an avoid region. The purpose of this advice is to warn the pilot that, should he lose an engine in the current flight regime, he would have a severely limited capability to maneuver out of any difficulty (particularly enemy ground fire or obstacle avoidance). But if engine 2 has failed, an affirmative result of test 111 will reach a test 112 where it is determined whether the altitude is less than the altitude of demarcation between the land and fly away portions of the low airspeed dead man curve in FIG. 2. This may be on the order of 25 feet, for instance. If the altitude is below 25 feet, this indicates the land portion of the low airspeed dead man's curve and a step 113 is reached to indicate to the pilot that he should land. But if a higher altitude is indicated, this indicates the fly away portion of the low airspeed dead man curve of FIG. 2, so a negative result of test 112 will reach a step 114 which will provide an indication to the pilot that he may fly away. In such a case, steps 107 and 108 are reached as described hereinbefore to indicate flight in the avoid region. The net result is that the pilot will be warned when he is in the avoid region, and if an engine also fails (of which he also has an indication), he will get further indications as to whether he should land or fly away.

If the tests 106 and 110 determine that neither the low altitude nor low airspeed dead man's curves are indicated by the avoid region word which is fetched, this means that the aircraft is flying in a regime which is safe with one failed engine, with or without the advantages of the present invention. It should be noted that in many instances, an engine may fail while in the dead man's zone, particularly the fly away portion of the low speed dead man's zone, and, by maneuvering, the pilot may move it out of the dead man's zone, such as into a cruise mode at bucket (minimum power) speed (on the order of 60 knots). Therefore, the conditions examined in FIG. 5 may readily change after engine failure. And, in the usual case, it is the purpose of this invention to enable the pilot to recover and enter into flight conditions which are safe with one engine failed, utilizing the super contingency engine control of the invention for extra power only long enough to maneuver out of the avoid region and reach a safe flight regime. In such case, negative results of tests 106 and 110 will cause a plurality of steps 116-119 to be reached which reset the indications to fly away or land, the indication of the avoid region, and the avoid region flat which is utilized by the subroutine of FIG. 6. Following either step 108 or step 119, as the case may be, this routine is exited and the super contingency routine 83 of FIG. 6 is reached through a transfer point 120.

Figure 6:
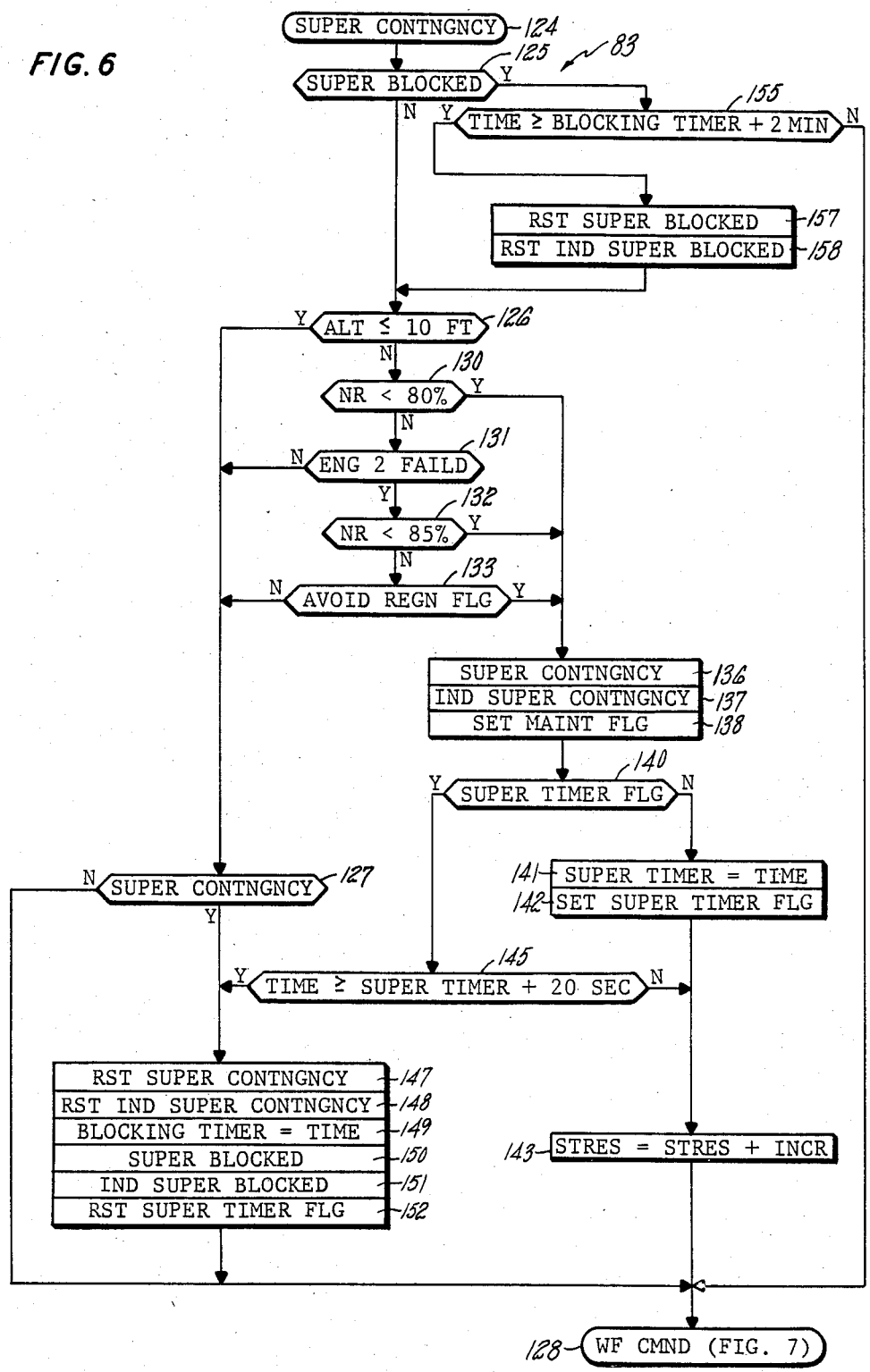
FIG. 6 is a simplified logic flow diagram of an exemplary routine for identifying super contingency conditions in accordance with the present invention.

The super contingency logic routine 83 is reached in FIG. 6 through an entry point 124, and a first test 125 determines whether or not entry into the super contingency delimited engine mode is blocked or not. As described hereinafter, once the mode has been entered one time, it is prevented from being entered again for a period of time to let the engine "rest", if desired, although this is not part of the present invention. In any event, in any given flight, the first time that super contingency conditions are indicated by the routine of FIG. 5 in any given flight, super contingency will not be blocked so that a negative result of test 125 will reach a test 126 to determine whether altitude is less than 10 feet. If the altitude is 10 feet or less, the helicopter can simply drop on the ground without severe damage so that there is no need to stress an engine by super contingency control thereof. Thus, below 10 feet super contingency is not permitted and, therefore, an affirmative result of test 126 will reach a test 127 to determine whether super contingency has previously been established. If not, the routine of FIG. 6 is simply exited and the weight of fuel command routine of FIG. 7 is reached through a transfer point 128. Assuming the altitude is greater than 10 feet, then a negative result of test 126 will reach a test 130 to determine if the rotor speed has drooped below 80%. This is one of the super contingency conditions which may be employed (alone or together with others) in the present invention, and may occur even when no engine has failed. Such a circumstance may exist when extremely severe maneuvering has been undertaken in order to avoid an obstacle or the like. In such a case, engine and rotor speed may droop so badly that continuance of the maneuver is either impossible or inadequate. In such a case, both fuel controls 23, 24 will provide supercontingency engine operation, delimiting the gas generators thereof, so as to drive the rotor speed back up. Such a condition should only last for on the order of a few seconds, and do relatively little harm to the engines in contrast with the potential for a crash. If the rotor speed is not less than 80%, then a negative result of test 130 will reach a test 131 where it is determined whether or not engine 2 has failed. If neither of these conditions exist, then the test 127 is reached as described hereinbefore. But if engine 2 has failed, test 131 will be affirmative, reaching a test 132 to determine if rotor speed has drooped below some higher value, such as 85%. This could be the case if the pilot, having lost an engine, is prudently cruising at minimum power speed (bucket speed), such as on the order of 60 knots, but is forced into some maneuver such as a sharp roll, sharp climb or nose up, which causes drooping of the rotor speed. But even after an engine fails, if the rotor speed is adequate, a negative result of test 132 will reach a test 133 to determine if the avoid region flag has been set by the subroutine of FIG. 5. The tests 130, 132, 133 comprise the circumstances under any one of which super contingency operation may be invoked in accordance with the embodiment of the invention described herein. As affirmative result of any of these tests will reach a step 136 which sets the super contingency discrete, a step 137 which indicates super contingency to the pilot, and a step 138 which sets a maintenance flag to ensure that maintenance personnel will notice that an engine has been stressed, after completion of the flight. Once super contingency is entered, a feature that may be employed with, but is not a part of the present invention, is to limit the period of time when the gas generator is delimited, and therefore the amount of stress on the engine. The purpose of this is to ensure that the engine won't be unnecessarily blown by lulling the pilot into thinking that he is flying in a relatively safe, nondestructive flight regime with his remaining engine power. If this feature is employed, following the steps 136–138, a test 140 will determine whether a super contingency timer flag has been set or not. Upon first pass through the steps 136–138, step 140 will always be negative thereby reaching a step 141 which sets the super contingency timer to the real time, and a step 142 which sets the super contingency timer flag so that subsequent passes through the steps 136–138 will reach an affirmative result at test 140, thereby not reestablishing time in the super contingency timer. Then, a stress accumulation register is incremented by some amount in a step 143 to provide an indication to maintenance personnel of the extent of time under which the engine was operated with exceptional limits during the super contingency mode. This provides an indication of the potential damage to the engine. For instance, if the engine is operated only for a second or two on a given flight under super contingency conditions, it may be reasonable to ignore that fact, depending upon the engine and depending upon the super contingency limits which are utilized (the degree of stress which is permitted in the routine of FIG. 7). In any event, the first pass into super contingency operation starts a timer, increments the stress factor and then reaches the transfer point 128.

In subsequent passes through the super contingency routine 83 of FIG. 6, so long as the super contingency condition continues to exist, the steps 136–138 will be passed through (although all of the indications therein are already set) and step 140 will be monitored. After the first pass, an affirmative result of test 140 will reach a test 145 which determines if the current time is equal to or greater than the time set into the super timer plus a suitable limiting interval (the interval in which the engine is going to be allowed to be operated with higher limits in accordance with the invention), such as 20 seconds. In the initial passes, the time will not have expired, so that a negative result of test 145 will reach the step 143 which increments the stress indicator and the program is exited through transfer point 128. Assuming that super contingency conditions do continue for more than the allowed increment of time, eventually test 145 will be affirmative reaching a series of steps 147–152 which take the program out of the super contingency mode and establish blocking of reentry for some period of time. A step 147 resets the super contingency discrete which was set in step 136. A step 148 resets the indication of being in the super contingency mode of operation, and a step 149 sets a blocking timer to the current real time. A step 150 sets the discrete indicating that super contingency operation is blocked, which is examined at the entry of the routine in test 125. This will preclude reestablishing super contingency for some period of time as described hereinafter. And a step 151 provides an indication to the pilot that super contingency is blocked and therefore he should avoid the dead man zones (the avoid regions of FIG. 2) in his maneuvering, since he will be unable to get extra power from this engine in accordance with the invention. And a step 152 resets the super contingency timer flag so that upon subsequent reentry (after blocking is removed), timing of the next permitted cycle of super contingency operation can be achieved as described hereinbefore.

Whenever any of the steps 126, 131, or 133 has a negative result, the test 127 is reached. If the aircraft has invoked super contingency operation, but the conditions improve and/or the aircraft has reached a low altitude (10 feet or less), then there is no need to further stress the engine, and an affirmative result of test 127 will cause all of the resetting and blocking operations of steps 147–152 in the same fashion as when super contingency operation is ended by the timer, as described hereinbefore. Thus, super contingency operation is maintained only so long as necessary and reversion to normal engine limits is achieved as soon as conditions permit it, or as limited by the timer.

On any given flight, once super contingency has been invoked and ended, the super contingency blocked discrete set in step 150 is examined in test 125 and found to be affirmative. This reaches a test 155 which determines if the current real time is equal to or greater than the time established in the blocking timer plus a desired blocking interval, such as two minutes. Initially, test 155 will always be negative causing the program to exit through step 128. Thus when super contingency is blocked, substantially the entire subroutine of FIG. 83 is bypassed. Eventually, the blocking timer may time out and an affirmative result of test 155 will reach steps 157 and 158 which reset the super contingency blocked discrete (thereby enabling a negative result of test 125 in a subsequent pass through the routine) and resetting the pilot's indication that he no longer can invoke super contingency. Within this same pass through the subroutine of FIG. 6, the conditions for super contingency in tests 126 and 130–133 may be examined and super contingency reestablished, if necessary.

It should be pointed out that the super contingency timer set in test 141 and tested in step 145 as well as the blocking timer set in step 150 and tested in test 155, and their related features, need not be used in any implementation of the present invention, unless desired. And, the time limitations therein or the use of one of them without the other will depend in part on the nature of super contingency limits (the degree of stress imposed on the given engine) the characteristics of the engine, and the mission or function which the aircraft employing the present invention will be performing. For instance, in an aircraft which may be expected to invoke super contingency far beyond enemy lines in a military environment, it probably would be wise not to preclude multiple usage of super contingency, as long as it is not abused. On the other hand, in a passenger helicopter operating where there are many opportunities for emergency landings, a second instance of super contingency might be entirely precluded (blocked) without reestablishment by a timer. In such a case, the super contingency block function of step 150 would be present, but no timer would be employed to reset it. The resetting would occur only at the end of the current flight. Similarly, no timer may be used at all in aircraft which have suitable limits, suitable engines and suitable anticipated utilization wherein only a single super contingency operation is expected, but the conditions might be such that cutting off with a timer could be disastrous. Therefore, consideration of aircraft characteristics, the degree of stress permitted by the super contingency limits chosen, and the expected use of the aircraft will be made to determine how the invention is to be employed, and which features may be incorporated therewith.

The principal function of the routine of FIG. 6 is to set the super contingency discrete in step 136 so long as adverse conditions exist and time has not precluded the use thereof. This is utilized in the weight of fuel command subroutine 84 of FIG. 7 which is reached through an entry point 160. A first test 161 determines if the super contingency discrete has been set or not. If it has not, which is the normal situation, a negative result of test 161 will reach a series of steps 162–165 which set suitable limits in the engine. In the embodiment herein, limits relating to the gas generator portion of the fuel control are established in steps 162–165 and may include a normal speed limit, a normal temperature limit, a normal acceleration schedule address and a normal maximum fuel flow limit. On the other hand, if super contingency is invoked, an affirmative result of test 161 will reach a series of steps 166–169 which set the speed, temperature and flow limits higher, and specify an address to reach a higher acceleration schedule. The remainder of the subroutine of FIG. 7 simply provides gas generator fuel flow in a manner which is known in the art, and is typical of how the invention may be used, although it may be used in different ways in any fuel control employing different control algorithms.

Once the limits have been set either to be normal or to be high in response to super contingency conditions of the invention, the weight of fuel command signal is generated in the same fashion, regardless of whether or not the super contingency of the present invention is invoked. Specifically, a plurality of steps and tests 170–173 perform the gas generator speed control function of the block 59 of FIG. 1. The gas generator speed error is determined in step 170 by subtracting the actual gas generator speed from the gas generator speed commanded by the output of the turbine governor. This speed error signal is used in a step 171 to generate the weight of fuel/compressor discharge pressure ratio for speed considerations as a lag gain function $(K1/TS+1)$ of the speed error together with some proportion of gas generator speed, $K2(NG\ CMND)$. The proportional function need not always be used, but typically is used to provide an open loop minimum fuel flow rate to maintain gas generator idle speed when turbine speed is satisfied. Then a test 172 determines if the speed-generated fuel pressure ratio exceeds the gas generator speed limit (which is either the normal limit set in step 162 or the super contingency limit set in step 166), and if it is excessive, a step 173 sets it equal to the speed limit.

A pair of steps 176, 177 perform the temperature limit function of block 60 in FIG. 1. Test 176 determines the difference between a gas temperature limit and the measured gas temperature indicated by the signal on the line 44 and then step 177 generates a weight-to-pressure ratio as a function of temperature: some constant times the temperature difference. The function of the acceleration schedule of block 61 in FIG. 1 is more complicated. In a computerized embodiment, instead of calculating the schedule or having a complex arrangement of function generators, a simple implementation is storing a map of acceleration schedules as a function of compressor discharge pressure and gas generator speed. In accordance with the present invention, two such schedule maps are stored, one which is normal and one which is employed when super contingency conditions exist. Therefore, instead of formulating an address simply from gas generator speed and compressor discharge pressure, an address component (such as merely the high order address bit) as a function of normal or super contingency must also be employed. A subroutine 180 will formulate the address and fetch the correct weight of fuel to compressor discharge pressure ratio from the acceleration schedule tables. Then, the least select function of the block 63 of FIG. 1 is performed by a series of steps and tests 182–186. First, the weight of fuel to compressor discharge pressure ratio is set equal to that provided by the acceleration schedule simply as a starting point, in a step 182. Then a test 183 determines if that which has been established by the acceleration schedule is less than that established as a function of gas generator speed. If it is, it remains the same. But if not, a negative result of test 183 reaches a step 184 where the ratio is set equal to that established as a function of speed. Then a test 185 determines if the ratio so far determined to be least is also less than that established as a function of temperature. If it is, it remains the same; but if not, a negative result of test 185 reaches a step 186 which sets the ratio equal to that established by temperature. In this manner, if the speed is too low or the speed differs too much from that commanded by the turbine governor, the speed control will command a fuel flow to increase the generator speed. However, if the temperature is too high, the amount of fuel permitted by the temperature limitation may be less than that, so it will be the controlling factor. Similarly, if the acceleration would be too great, the acceleration schedule will indicate that, so its output would be used as an indication of the desired fuel flow. In other words, this type of fuel control will either attempt to supply the turbine with its desired speed or set a gas generator idle speed, unless the temperature is too high or too great an acceleration would result. This is a common form of fuel control.

In a step 190, the weight of fuel to compressor discharge pressure ratio is multiplied by the compressor discharge pressure (equivalent to block 65 in FIG. 1) so as to provide an unlimited weight of fuel command, which is then tested by a step 191 to determine if it is less than an absolute fuel command limit. If not, a negative result of step 191 causes the weight of fuel command to be equal to the fuel command limit in a step 192. Then, other parts of the computer program are reverted to through an end of routine 193.

The invention has been described in terms of routines which may be employed in the computer of a computerized fuel control to implement the present invention. However, the routines described herein may be actually implemented in an automatic flight control system computer, for use in the fuel control. The only discretes necessary to be brought from a computer program of the present invention into the fuel control is whether the limit should be normal or some other limits related to super contingency. Similarly, the invention may be implemented using dedicated digital hardware, such as arithmetic units, logic circuits, and the like. Or the invention could be implemented (although it is deemed to be difficult) in a hydromechanical fuel control in a manner analogous to the operation of prior art hydromechanical fuel controls.

The invention is illustrated as being employed in a twin engine helicopter. It is equally useful in a helicopter having more engines (at least one three-engine helicopter is currently in production). Aspects of the invention, although not as necessary nor useful, may be employed in fixed wing aircraft as well; and, where appropriate, in single engine aircraft. The various times and other limitations alluded to herein are, of course, only exemplary to provide some real world indication of the relationships therebetween and the general nature thereof. Of course, implementation of the invention with respect to any engine for any particular aircraft must take into account the design considerations of such a combination. The disclosed features of timing the extent of super contingency and blocking it out need not be used except when found to be desirable, and the time limits thereof must, of course, be established to suit the particular embodiment of the invention. Regardless of what type of engine is used or what type of fuel control may be used therewith, it should be understood that whatever limits there may be on such operation may be expanded under super contingency conditions utilizing techniques which are appropriate for such an engine in view of the description herein with respect to the exemplary engine and fuel control type of the present embodiment.

Although not described in FIG. 5, some protocol could be established, if desired, to avoid having plural fuel controls attempting to provide indications to the pilot relative to land, fly away, avoid region and super contingency. Thus, if engine 1 has been deemed to have failed, the indications of steps 113, 114, 108, and the like could be blocked from being generated by the engine 1 controller, if desired. However, having plural systems redundantly establishing these indications is probably the safer way to go.

Similarly, the fly away and landing indications may be provided whenever the aircraft is in the avoid region, whether or not an engine has failed, or may be constantly provided, if desired. The manner, order and combination of indications to the pilot may be adjusted so as to suit any implementation of the invention: the significant thing is that the pilot will be advised of these factors, and the scheme presented herein is deemed to represent both knowledge when needed and a change in indicators as indications change, so as to attract the pilot's attention and have him take note thereof when necessary.

Similarly, although the invention has been shown and described with respect to exemplary embodiments, it should be understood by those skilled in the art that the foregoing and various other changes, omissions and additions may be made therein and thereto, without departing from the spirit and the scope of the invention.

We claim:

1. A control for an aircraft engine, comprising:
   means for providing a speed signal indicative of engine speed;
   means for providing an engine signal indicative of at least one additional engine operating parameter;
   means for metering fuel to the engine in response to a fuel command signal provided thereto; and
   signal processing means for providing, in response to said speed signal and said engine signal, said fuel command signal under constraint of normal engine limits;
   wherein the improvement comprises:
   means for providing a flight parameter signal indicative of an aircraft flight parameter directly dependent on engine power; and
   said signal processing means comprising means responsive to said flight parameter signal for providing a super contingency signal indicative of a need for engine power in excess of engine power available at rated engine conditions, and responsive to said super contingency signal for providing, in response to said speed signal and said engine signal, said fuel command signal under constraint of super contingency engine limits which are higher than said normal engine limits.

2. A control for an engine of a helicopter having a main rotor, comprising:
   means for providing a speed signal indicative of engine output shaft speed;
   means for providing an engine signal indicative of at least one additional engine operating parameter;
   means for metering fuel to the engine in response to a fuel command signal provided thereto; and
   signal processing means for providing, in response to said speed signal and said engine signal, said fuel command signal under constraint of normal engine limits;
   wherein the improvement comprises:
   means for providing a rotor speed signal indicative of the rotary speed of the helicopter main rotor; and
   said signal processing means comprising means responsive to said rotor speed signal for providing a super contingency signal in response to the speed indicated by said rotor speed signal being below a safe threshold speed, and responsive to said super contingency signal for providing, in response to said speed signal and said engine signal, said fuel command signal under constraint of super contingency engine limits which are higher than said normal engine limits.

3. A control for an aircraft having a plurality of engines and a related engine controller for each engine, comprising:

means related to each engine for providing a plurality of engine parameter signals indicative of engine operating parameters; and control means related to each engine and responsive to the parameter signals related to the related engine for providing fuel to the related engine corresponding to normal limited functions of the parameters indicated by said engine parameter signals;

wherein the improvement comprises:

means corresponding to each engine for providing, to the control related to another one of said engines, an engine failed signal indicative of the corresponding engine having failed; and said control means for each engine comprising means responsive to an engine failed signal provided thereto from another one of said engines, for providing fuel flow to the related engine corresponding to abnormal limited functions of the parameters indicated by said engine parameter signals, which abnormal limited functions correspond to higher limits than those of said normal limited functions.

4. A control for a helicopter having a plurality of engines and an engine control corresponding to each of said engines, comprising:

means related to each engine for providing a plurality of parameter signals indicative of engine operating parameters; and means related to each engine and responsive to the parameter signals related to the corresponding engine for providing fuel to the engine corresponding to rated, limited functions of parameters indicated by said engine parameter signals;

wherein the improvement comprises:

means providing a plurality of flight parameter signals, including an altitude signal indicative of the altitude of the aircraft and an airspeed signal indicative of the forward airspeed of the aircraft, and for providing, in response to said flight parameter signals, an avoid region signal indicative of the helicopter flying under flight conditions, indicated by said flight parameter signals, at which the helicopter cannot safely fly in the event of failure of one engine with the remaining engine power provided in response to said rated, limited functions, and for providing an indication thereof to the pilot.

5. A helicopter control according to claim 4 further comprising:

means corresponding to each engine for providing, to the control related to another one of said engines, an engine failed signal indicative of the corresponding engine having failed; and said control means for each engine being responsive to concurrence of an engine failed signal, provided thereto corresponding to another one of said engines, with said avoid region signal for providing fuel flow to the related engine corresponding to abnormal limited functions of the parameters indicated by said engine parameter signals, which abnormal limited functions correspond to higher limits than those of said rated, limited functions.

6. A helicopter control according to claim 4 wherein said avoid region means comprises means for alternatively providing to the pilot a fly-away indication indicative of the fact that the helicopter may be flown away, in response to said avoid region signal being provided in response to a flight parameter signal indicative of an altitude in excess of a safe threshold altitude, or a land indication indicative of the fact that the helicopter cannot be flown away, in response to said avoid region signal being provided in response to a flight parameter signal indicative of an altitude less than said safe threshold altitude.

7. A control for an aircraft having a plurality of engines and a related engine controller for each engine, comprising:

means related to each engine for providing a plurality of engine parameter signals indicative of engine operating parameters; and control means related to each engine and responsive to the parameter signals related to the corresponding engine for providing fuel to the related engine corresponding to rated, limited functions of the parameters indicated by said engine parameter signals;

wherein the improvement comprises:

means for providing a plurality of flight parameter signals including an altitude signal indicative of the altitude of the helicopter and an airspeed signal indicative of the forward airspeed of the helicopter;

means corresponding to each engine for providing, to the control related to another one of said engines, an engine failed signal indicative of the corresponding engine having failed; and said control means for each engine comprising means for providing, in response to said flight parameter signals, an avoid region signal indicative of the helicopter flying under conditions, indicated by said flight parameter signals, at which the helicopter cannot safely fly in the event of an engine failure with the remaining engine power provided in response to said rated, limited function, and responsive to current presence of said avoid region signal and an engine failed signal provided thereto from another one of said engines, for providing fuel flow to the related engine corresponding to abnormal limited functions of the parameters indicated by said engine parameter signals, which abnormal limited functions correspond to higher limits than those of said rated, limited functions.

* * * * *